(12) United States Patent
Ryu

(10) Patent No.: US 9,208,575 B2
(45) Date of Patent: Dec. 8, 2015

(54) METHOD AND DEVICE FOR DETECTING FACE, AND NON-TRANSITORY COMPUTER-READABLE RECORDING MEDIUM FOR EXECUTING THE METHOD

(71) Applicant: Woo Ju Ryu, Kyunggi (KR)

(72) Inventor: Woo Ju Ryu, Kyunggi (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/344,146

(22) PCT Filed: Nov. 2, 2012

(86) PCT No.: PCT/KR2012/009157
§ 371 (c)(1),
(2) Date: Mar. 11, 2014

(87) PCT Pub. No.: WO2013/066095
PCT Pub. Date: May 10, 2013

(65) Prior Publication Data
US 2014/0341430 A1    Nov. 20, 2014

(30) Foreign Application Priority Data
Nov. 3, 2011  (KR) .......................... 10-2011-0114160

(51) Int. Cl.
*G06T 7/20*   (2006.01)
*G06K 9/00*   (2006.01)
(Continued)

(52) U.S. Cl.
CPC .......... *G06T 7/2033* (2013.01); *G06K 9/00261* (2013.01); *G06K 9/00268* (2013.01);
(Continued)

(58) Field of Classification Search
CPC ......... G06T 7/004; G06T 7/0089; G06T 3/40; G06T 3/60; G06T 7/0081; G06T 7/2033; G06T 2207/10016; G06T 2207/20081; G06T 2207/20141; G06T 2207/30201; G06K 9/00261; G06K 9/00268
See application file for complete search history.

(56) References Cited

U.S. PATENT DOCUMENTS

2005/0094854 A1*  5/2005  Kim .............................. 382/118
2008/0013837 A1*  1/2008  Porter et al. .................. 382/218

OTHER PUBLICATIONS

Viola, Paul, and Michael J. Jones. "Robust real-time face detection." International journal of computer vision 57.2 (2004): 137-154. [Accessed Online Apr. 29, 2015] http://link.springer.com/article/10.1023/B:VISI.0000013087.49260.fb.*

(Continued)

*Primary Examiner* — Utpal Shah
*Assistant Examiner* — Kate R Duffy
(74) *Attorney, Agent, or Firm* — Blakely, Sokoloff, Taylor & Zafman LLP

(57) ABSTRACT

In the present disclosure, a plurality of frames of input images sequentially received for a predetermined time interval is obtained, and a face detecting operation is performed on a first frame if a full detecting mode is implemented. If a face is detected from a specific region of the first frame during the face detecting operation, a face tracking mode is implemented, a second frame is divided to produce the divided input image portions of the second frame, and the face tracking operation is performed on a surrounding region of the specific region of the divided input image portions of the second frame that corresponds to the specific region in the first frame. If the face is not detected in the face tracking mode, a partial detecting mode is implemented, and the face detecting operation is performed on image portions resized on divided input image portions of a third frame to which a specific region of the third frame corresponding to the specific region of the first frame belongs.

20 Claims, 7 Drawing Sheets

(51) Int. Cl.
 *G06K 9/62* (2006.01)
 *G06T 3/40* (2006.01)
 *G06T 3/60* (2006.01)
 *G06T 7/00* (2006.01)
 *G06K 9/20* (2006.01)

(52) U.S. Cl.
 CPC ............. *G06K9/2054* (2013.01); *G06T 3/40* (2013.01); *G06T 3/60* (2013.01); *G06T 7/0081* (2013.01); *G06K 9/6256* (2013.01); *G06T 2207/10016* (2013.01); *G06T 2207/20081* (2013.01); *G06T 2207/20141* (2013.01); *G06T 2207/30201* (2013.01)

(56) References Cited

OTHER PUBLICATIONS

PCT Search Report, PCT/KR2012/0019157, 1 page, Feb. 15, 2013.

* cited by examiner

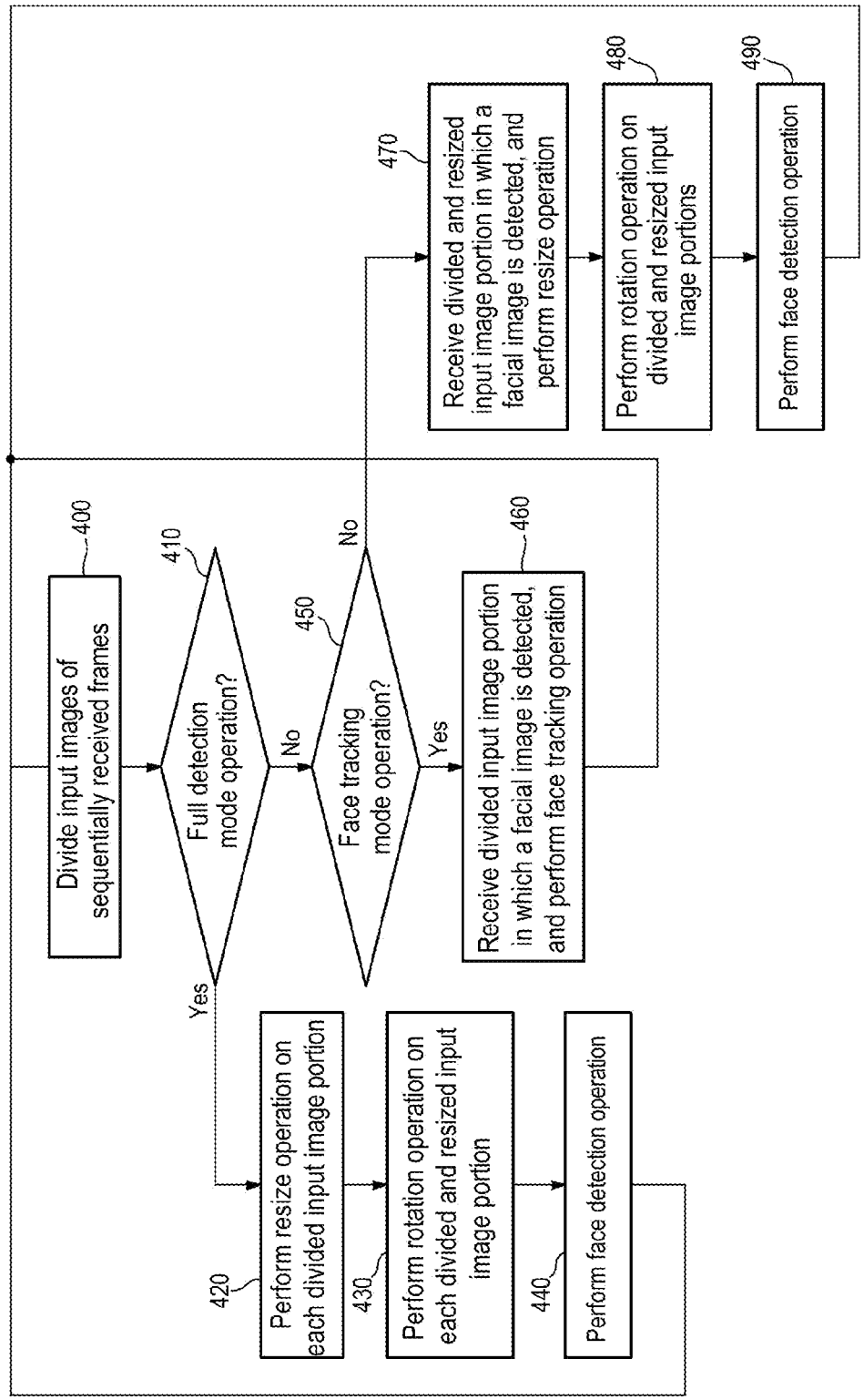

METHOD AND DEVICE FOR DETECTING FACE, AND NON-TRANSITORY COMPUTER-READABLE RECORDING MEDIUM FOR EXECUTING THE METHOD

The present patent application is a U.S. National Phase Application under 35 U.S.C. 371 of International Application No. PCT/KR2012/009157 filed Nov. 2, 2012, which claims priority from Korean Application No. 10-2011-0114160, filed Nov. 3, 2011, the contents of which are incorporated herein in their entirety by reference.

TECHNICAL FIELD

The present disclosure relates to a method and device for detecting a face, and a non-transitory computer-readable recording medium for executing the method. According to the method, when a face is detected from an input image that is captured by an image pickup device, a face tracking mode operation or a partial detection mode operation is performed on some or all of the divided regions in a subsequently received input image (the divided regions including a region in the subsequently received input image corresponding to a region in which a face was detected in the preceding input image) to detect the face in the subsequently received input image in a manner in which the probability of detecting a face is enhanced while the number of operations required therefor is reduced.

BACKGROUND

As portable terminals have continued to be miniaturized, making them ever thinner and lighter, their portability has continuously improved over the years, resulting in a greater demand for portable terminals. In lockstep, additional features mounted on the portable terminals have also diversified.

Particularly, one such additional feature, the digital camera functionality, has recently become perceived by consumers as being indispensable. The digital camera functionality is now included in most portable terminals.

Such digital camera functionality may include, in addition to simply taking an image, performing a face detection operation for detecting a facial image from an input image captured through a camera, and then performing a variety of recognition operations such recognizing a smile, a blink or the like.

Additionally, conventional face detection methods include being able to resize frames into a variety of sizes and detect faces in all of the images in the resized frames. For example, such conventional techniques were developed by Paul Viola and Michael J. Jones and were disclosed in the paper entitled "Robust Real-Time Face Detection" issued in "International Journal of Computer Vision, Volume 57, Issue 2" in May 2004 (see the paragraphs before section 3 of the paper). Such conventional techniques, however, have a problem of requiring large amounts of calculations, and thus taking a lot of time to perform the face detection operation.

DETAILED DESCRIPTION

Objects of Present Disclosure

Therefore, at least one object of the present disclosure is to solve the above-described problems.

In addition, at least another object of the present disclosure is to reduce the time required for performing a face detection operation by: partitioning each of sequentially received input images received over a predetermined time period into a predetermined number of regions; performing a face detection operation on each of the divided regions of an input image from the sequentially received input images; and, if a face is detected from at least one of the divided regions, detecting the face on subsequently received input images received after the input image by performing a face tracking mode operation or a partial detection mode operation on all or some of corresponding divided regions in the subsequently received input images.

Technical Means of Present Disclosure

According to an aspect of the present disclosure, there is provided a face detection method, which includes: (a) generating divided input image portions by dividing each of an input image from a plurality of input images into a predetermined number of regions, the input images including a plurality of frames sequentially received over a predetermined time period; (b) resizing the respective divided input image portions and performing a face detection operation on at least one of the divided and resized input image portions, when in a full detection mode operation; (c) when a face is detected in a specific region in at least one input image portion of a first frame from among the divided and resized input image portions during the face detection operation, proceeding to a face tracking mode operation and performing a face tracking operation on a surrounding area of a specific region in a divided and resized input image portion of a second frame corresponding to the specific region in the at least one input image portion of the first frame in which a face was detected from among the divided and resized input image portions; and (d) when a face is not detected in the face tracking operation, proceeding to a partial detection mode operation and performing a face detection operation on a divided and resized input image portion of a third frame, the divided and resized input image portion of the third frame including a specific region corresponding to the specific region in the at least one input image portion of the first frame in which the face was detected.

According to another aspect of the present disclosure, there is provided a face detection method, which includes: (a) acquiring input images including a plurality of frames received in a sequence in time for a predetermined time period; (b) when in a full detection mode operation, performing a facial detection operation on a first frame; (c) if a face is detected in a specific region in the first frame during the full detection mode operation, proceeding to a face tracking mode operation to generate divided input image portions of a second frame and to perform a face tracking operation on a surrounding area of a specific region in the divided input image portion of the second frame corresponding to the specific region in the first frame; and (d) if a face is not detected during the face tracking mode operation, proceeding to a partial detection mode operation to perform a face detection operation on a divided and resized image portion of a third frame having a specific region corresponding to the specific region in the first frame.

According to still another aspect of the present disclosure, there is further provided a face detection device, which includes: an image dividing unit for dividing each of input images to generate an n number of divided input image portions, the input images including a plurality of frames received in sequence over a predetermined time period; a mode change unit for transmitting in parallel the n number of divided input image portions of a first frame when a full detection mode signal is generated for the first frame, transmitting a divided input image portion including a specific region of a second frame corresponding to a specific region of the first frame in which a face is detected when a face tracking mode signal is generated for the second frame temporally succeeding the first frame, and transmitting a divided input image portion including a specific region of a third frame corresponding to the specific region of the first frame in which the face is detected when a partial detection mode signal is generated for the third frame temporally succeeding the second frame; an n number of face detection units for detecting a face by resizing the divided input image portions of the first or third frame transmitted through the mode change unit and performing a face detection operation; an n number of face tracking units for performing a face tracking operation on a surrounding area of the specific region of the divided input image portion of the second frame transmitted through the mode change unit; and a mode change signal generation unit for generating the face tracking mode signal when the n number or face detection units indicate that a face is detected in at least one divided and resized input image portion from among the n number of divided and resized input image portions of the first frame, and generating the partial detection mode signal if the n number of face tracking units indicate that a face is not detected in the divided input image portion of the second frame.

According to still another aspect of the present disclosure, there is further provided a face detection device, which includes: an image dividing unit for dividing each of an input image into a predetermined number of regions to generate divided input image portions, the input images including a plurality of frames received in sequence over a predetermined time period; a mode change unit for sequentially transmitting the divided input image portions of a first frame when a full detection mode signal is generated for the first frame, sequentially transmitting a divided input image portion including a specific region of a second frame corresponding to a specific region of the first frame in which a face is detected when a face tracking mode signal is generated for the second frame temporally succeeding the first frame, and sequentially transmitting a divided input image portion including a specific region of a third frame corresponding to the specific region of the first frame in which the face is detected when a partial detection mode signal is generated for the third frame temporally succeeding the second frame; a face detection unit for detecting a face by resizing the divided input image portions of the first or third frame transmitted through the mode change unit and performing a face detection operation; a face tracking unit for performing a face tracking operation on a surrounding area of the specific region in the divided input image portion of the second frame transmitted through the mode change unit; and a mode change signal generation unit for generating the face tracking mode signal when the face detection unit indicates that a face is detected in at least one divided and resized input image portion from among the divided and resized input image portions of the first frame, and generating the partial detection mode signal when the face tracking unit indicates that a face is not detected in the divided input image portions of the second frame.

In addition, there is further provided a non-transitory computer-readable recording medium for recording a computer program for executing the above-described methods for implementing the various embodiments of the present disclosure.

Advantageous Effects of Present Disclosure

According to the present disclosure, when a face is first detected by performing a full face detection operation on an input image, the face is detected by performing a face tracking mode operation or a partial detection mode operation on some or all divided regions in subsequently received input images, which includes determining a region corresponding to a region where the face was first detected in the preceding input image. Therefore, face detection for the subsequently received input images can be achieved without performing the more laborious full face detection operation on the entire subsequently received images, and thus, a time necessary for a face detection operation can be reduced.

In addition, according to the present disclosure, a time required for the face tracking operation can be reduced by optimally identifying, from regions of a divided facial image, a focus on a region having the highest probability of detecting a face.

BRIEF DESCRIPTION OF DRAWINGS

FIG. 8 is a flowchart illustrating an operation of a face detection method according to an embodiment of the present disclosure.

EMBODIMENTS

Figure 1:
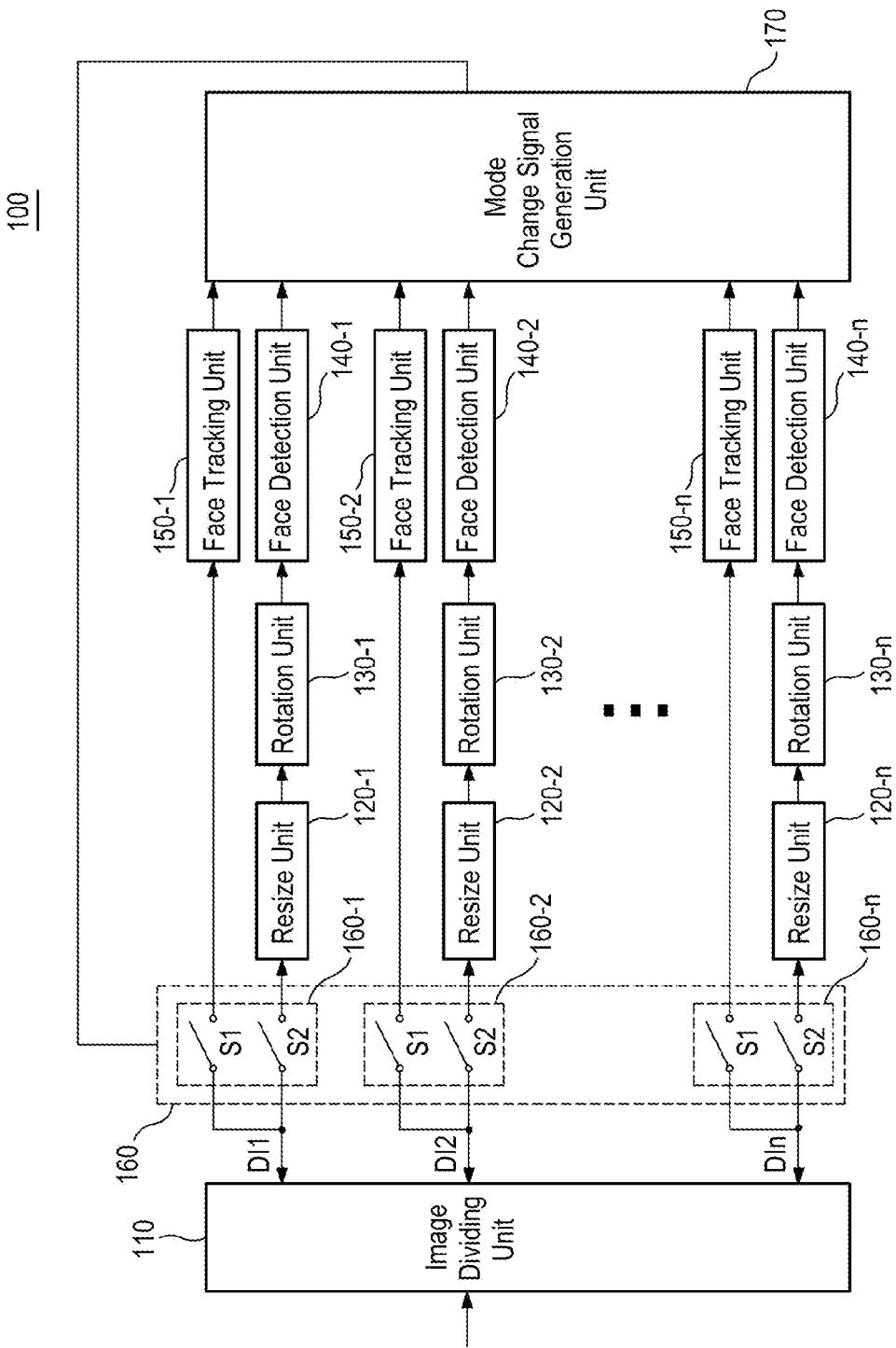
FIG. 1 is a block diagram illustrating a configuration of a face detection device according to an embodiment of the present disclosure.

In the following detailed description of the present disclosure, references are made to the accompanying drawings that show, by way of illustration, various embodiments in which the present disclosure may be implemented. These embodiments are described in sufficient detail to enable those skilled in the art to implement the present disclosure. It should be understood that various embodiments of the present disclosure, although different, are not necessarily mutually exclusive. For example, specific features, structures, and characteristics described in connection with one embodiment may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with a full range equivalent to what the claims claim. In the drawings, like reference numbers refer to the same or similar function through many ways.

Hereinafter, various embodiments of the present disclosure will be described in detail with reference to the accompanying drawings in order that those skilled in the art can easily implement the present disclosure.

FIG. 1 is a block diagram illustrating a configuration of a face detection device 100 according to an embodiment of the present disclosure.

Referring to FIG. 1, a face detection device 100 may include an image dividing unit 110, resize units 120-1 to 120-n, rotation units 130-1 to 130-n, face detection units 140-1 to 140-n, face tracking units 150-a to 150-n, a mode change unit 160, and a mode change signal generation unit 170. The mode change unit 160 includes switching units 160-1 to 160-n, and the each of the switching units 160-1 to 160-n may include switches S1 and S2.

The image dividing unit 110 may generate divided input image portions DI1 to DIn by dividing an input image that is received via an image pickup device, such as a camera, into a predetermined number of image portions. The input images described herein may include a predetermined number (e.g., thirty) of input images (in the unit of frame) that are received for a predetermined time period (e.g., one second). Herein, while the term "dividing" may mean an actual dividing operation, it is apparent that the above term may include an operation on an image to treat the image as having been divided in a virtual sense.

The respective resize units 120-1 to 120-n may receive the divided input image portions DI1 to DIn divided by the image dividing unit 110 and generate resized divided image portions by resizing the input image portions into a predetermined number of image portions, which may be of different sizes.

The respective rotation units 130-1 to 130-n may generate rotated image portions by rotating the divided and resized image portions by a predetermined number of angles different from one another.

The respective face detection units 140-1 to 140-n may, once a face is detected, receive the divided, resized, and rotated image portions and perform a face detection operation. For example, the face detection operation may be performed using feature patterns learned and selected by an Adaboost learning algorithm.

The respective face tracking units 150-1 to 150-n may receive the divided input image portions and track whether the same face as the detected facial image is present in a surrounding area of a region of the divided input image in which a face was detected. For example, if a face was detected in a certain region of a divided input image of a first frame, each of the face tracking units 150-1 to 150-n may detect whether the same face as the facial image detected in the first frame is present in a region of a second frame, corresponding to a surrounding area and including the certain region of the divided input image portion, using a block matching method.

Here, although the block matching method is described as an example, the present disclosure is not necessarily limited thereto, and various modified examples such as using a feature point tracking method may be assumed.

Detecting a face from the entirety of a certain region obtained by using the resize units 120-1 to 120-n, the rotation units 130-1 to 130-n, and the face detection units 140-1 to 140-n (i.e., a partial detection mode) may be referred to as face tracking. However, since a face is detected using a separate algorithm such as the Adaboost learning algorithm or the like, herein, it is assumed for illustration purposes that a block matching or feature point tracking method other than a face detection method using the Adaboost learning algorithm or the like may be performed by the face tracking units 150-1 to 150-n. In a similar manner, a mode using a block matching or feature point tracking method other than a face detection method using the Adaboost learning algorithm or the like will be referred to as a tracking mode.

The mode change unit 160 may change to a partial detection mode by turning off the switches S1 and turning on the switches S2 in the switching units 160-1 to 160-n, when the mode change signal generation unit 170 (a) generates a partial detection mode signal for, from among the face tracking units 150-1 to 150-n, the face tracking units that did not detect a face or (b) generates a partial detection mode signal for, from among the face detection units 140-1 to 140-n, the face detection units that detected a face. Further, the mode change unit 160 may change to a face tracking mode by turning on corresponding switches S1 and turning off corresponding switches S2 in the switching units 160-1 to 160-n, when the mode change signal generation unit 170 (a) generates a face tracking mode signal indicating that the face tracking units 150-1 to 150-n respectively detected a face by using a block matching method or the like, or (b) for cases where a face is detected by at least one face detection unit from among the face detection units 140-1 to 140-n in operation of a full detection mode (a mode of detecting a face in all divided regions of an input image, which will be described below in further detail), generates a face tracking mode signal indicating that block matching or the like should be applied for, from among the face detection units 140-1 to 140-n, at least one face detection unit that detected the face. The mode change unit 160 may change to a full detection mode by turning off all of the n number of switches S1 and turning on all of the n number of switches S2 in the switching units 160-1 to 160-n, when the mode change signal generation unit 170 (a) generates a full detection mode signal indicating that all of the divided regions should be detected since all of the face detection units 140-1 to 140-n failed to detect a face, or (b) periodically generates a full detection mode signal regardless of whether a face is or is not detected by any of the face detection units 140-1 to 140-n.

Figure 2:
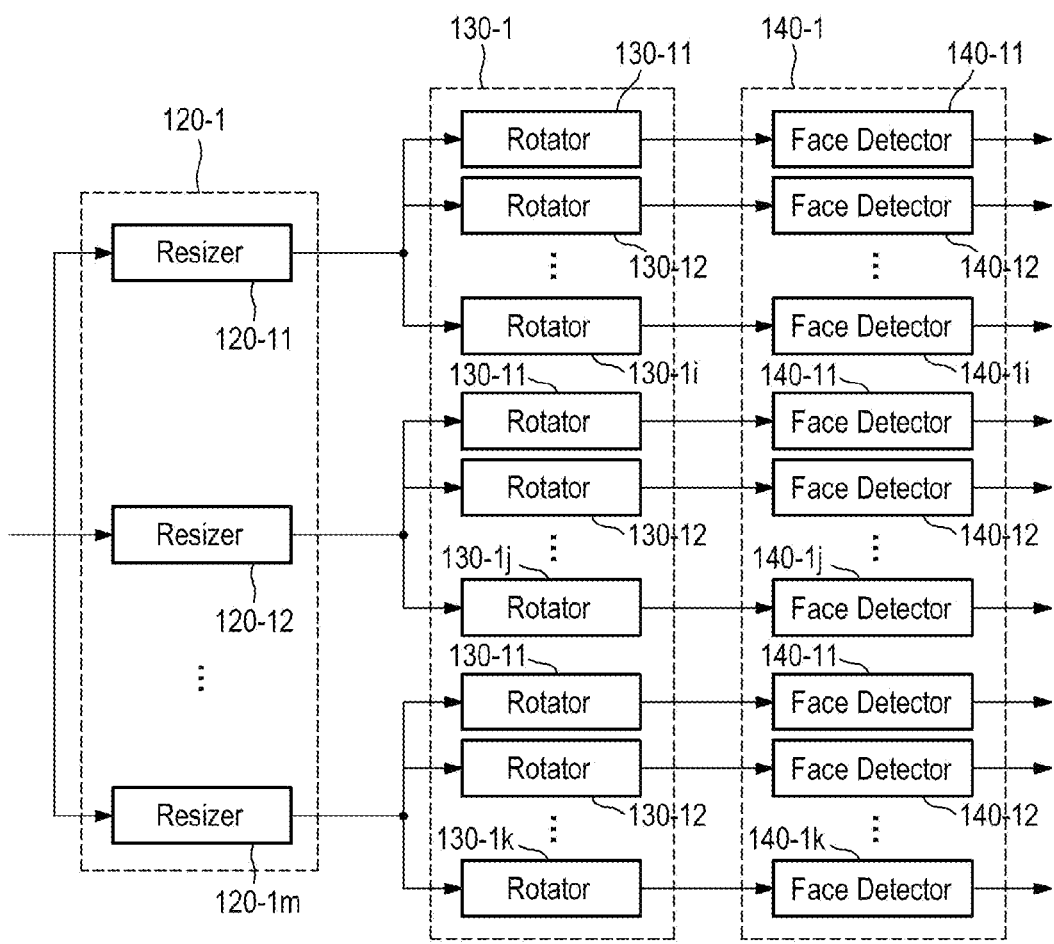
FIG. 2 is a block diagram illustrating a configuration of a resize unit, rotation unit, and face detection unit of FIG. 1.

FIG. 2 is a block diagram illustrating the configuration of a resize unit 120-1, rotation unit 130-1, and face detection unit 140-1 of FIG. 1.

Referring to FIG. 2, the resize unit 120-1 may include an m number of resizers 120-11 to 120-1m; the rotation unit 130-1 may include an i number of rotators 130-11 to 130-1i, a j number of rotators 130-11 to 130-1j, and a k number of rotators 130-11 to 130-1k; and the face detection unit 140-1 may include an i number of face detectors 140-11 to 140-1i, a j number of face detectors 140-11 to 140-1j, and a k number of face detectors 140-11 to 140-1k.

Functions of each block shown in FIG. 2 are as follows.

The m number of resizers 120-11 to 120-1m may respectively adjust a divided input image portion into different sizes. For example, the resizer 120-11 may generate a divided input image portion having the same size as that of an input image portion provided by the image dividing unit 110, the resizer 120-12 may generate a divided input image portion of a half size, and the resizer 120-1m may generate a divided input image portion of a one tenth size. Since the resizer 120-11 generates the divided input image portion of the same size, it may not perform a resize operation.

Each of the resize units 120-2 to 120-n of FIG. 1 may be configured to have a different number of resizers from the resize unit 120-1 of FIG. 2, and may also be configured using resizers having the same magnifications as or different magnifications from the resizers of the resize unit 120-1 of FIG. 2.

The i number of rotators 130-11 to 130-1i may rotate the divided and resized input image portions output from the resizer 120-11. For example, the rotator 130-11 may generate an image divided and resized but not rotated, the rotator 130-12 may generate an image divided, resized, and rotated by 45 degrees, and the rotator 130-1*i* may generate an image divided, resized, and rotated by −90 degrees.

The j number of rotators 130-11 to 130-1*j* may also rotate the divided and resized input image portions output from the resizer 120-12. The j number of rotators 130-11 to 130-1*j* may be configured to be the same as the i number of rotators 130-11 to 130-1*i* or may be configured to be different in number and to rotate the input image portions at different rotation angles therefrom. That is, the i number of rotators 130-11 to 130-1*i* may be configured to receive the divided and resized image portions and generate image portions divided, resized, and rotated by 0, 45, 90, −45, and −90 degrees, respectively, and the j number of rotators 130-11 to 130-1*j* may be configured to receive the divided and resized image portions and generate image portions divided, resized and rotated by 0, 90, and −90 degrees, respectively.

The k number of rotators 130-11 to 130-1*k* may also rotate the divided and resized input image portions output from the resizer 120-1*m*. The k number of rotators 130-11 to 130-1*k* may be configured to be the same as the i number of rotators 130-11 to 130-1*i* and the j number of rotators 130-11 to 130-1*j* or may be configured to be different in number and to rotate the input image portions at different rotation angles therefrom. That is, the k number of rotators 130-11 to 130-1*k* may be configured to receive the divided and resized image portions and generate image portions divided, resized and rotated by 0, 45, 90, −45, and −90 degrees, respectively, the j number of rotators 130-11 to 130-1*j* may be configured to receive the divided and resized image portions and generate image portions divided, resized and rotated by 0, 90, and −90 degrees, respectively, and the k number of rotators 130-11 to 130-1*k* may be configured to receive the divided and resized image portions and generate image portions divided, resized and rotated by 0, 45, and −45 degrees, respectively.

Here, since the rotator 130-11 generates a divided and resized but not rotated input image portion, a rotation operation may not be performed.

The face detectors 140-11 to 140-1*i*, 140-11 to 140-1*j*, and 140-11 to 140-1*k* may respectively receive the divided, resized, and rotated input image portions output from the rotators 130-11 to 130-1*i*, 130-11 to 130-1*j*, and 130-11 to 130-1*k* and perform a face detection operation.

Although the respective face detectors 140-11 to 140-1*i*, 140-11 to 140-1*j*, and 140-11 to 140-1*k* may perform a face detection operation using feature patterns learned and selected by an Adaboost algorithm, the present disclosure is not necessarily limited thereto, but various modified examples may be assumed.

The face detection device of the present disclosure may detect a facial image regardless of the size of a face since the input image may be resized into a variety of sizes and may detect facial images of a variety of postures, since the input image is rotated at a variety of angles.

Figure 3:
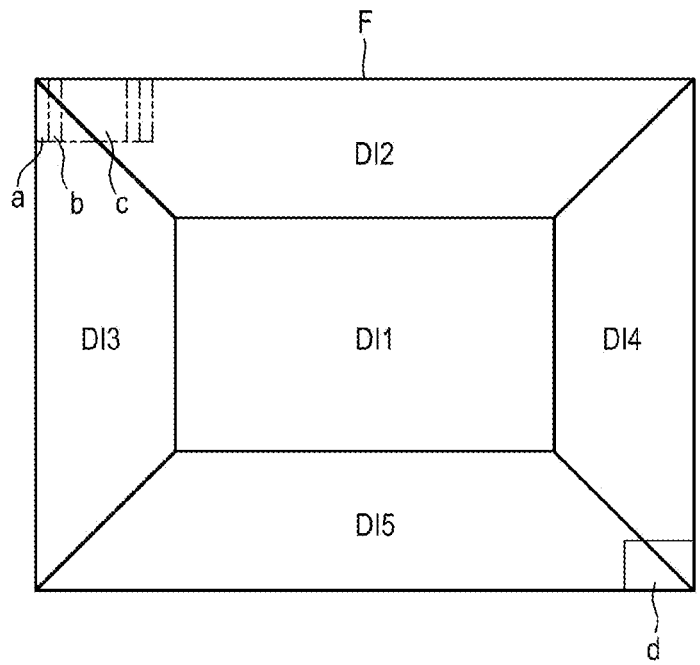
FIG. 3 is a diagram for illustrating the operation of an image dividing unit and a face detection unit of FIG. 1.

FIG. 3 illustrates the operation of the image dividing unit 110 and the face detection unit 140—shown in FIG. 1. In FIG. 3, "F" denotes a frame of an input image directly or indirectly received by an image pickup device, such as a camera, and "DI1" to "DI5" denote five image portions divided by the image dividing unit 110 shown in FIG. 1.

Referring to FIG. 3, the image dividing unit 110 of FIG. 1 may divide a frame F into, for example, the five divided image portions DI1, DI2, DI3, DI4, and DI5, and the face detection units 140-1 to 140-5 corresponding thereto may receive sub-window images a, b, c, . . . , d of a predetermined size that are to be respectively applied to the divided image portions and perform a face detection operation. The face detection operation may be performed for the divided image portions DI1, DI2, DI3, DI4, and DI5 by using the sub-window images of a predetermined size, e.g., including 5×5 pixel data.

In addition, from among the divided image portions, the resize and/or rotation operations may be performed on the divided input image portion DI1 that is positioned in or moved to the center region, in which it is more likely to find a face, with relatively more number of magnification ratios and/or rotation angles compared to the divided input image portions DI2 to DI4, in which it is less likely to find a face.

The full detection (FD) mode operation of the present disclosure may mean performing at least one face detection operation for, for example, five divided input image portions DI1, DI2, DI3, DI4, and DI5 in one frame F or a predetermined number of frames, and the partial detection mode operation may mean performing a face detection operation for some of divided input image portions in one frame F.

Figure 4A:
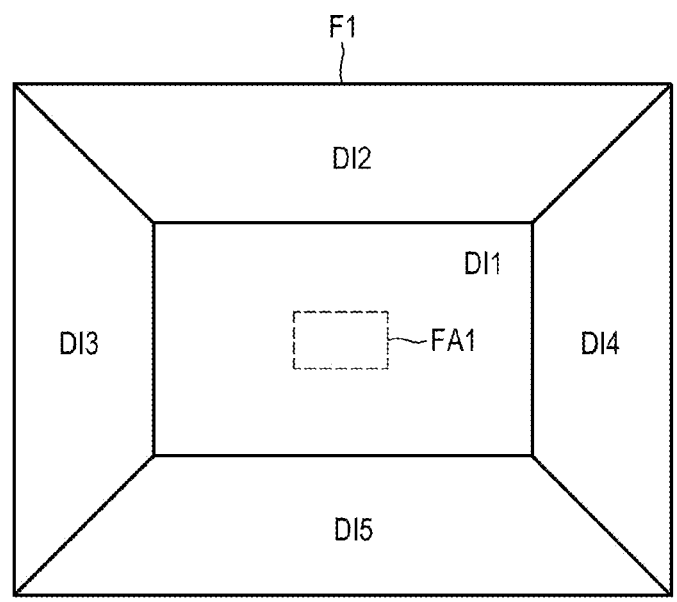
FIGS. 4A and 4B are diagrams illustrating the operation of an embodiment of a face tracking unit of FIG. 1.
Figure 4B:
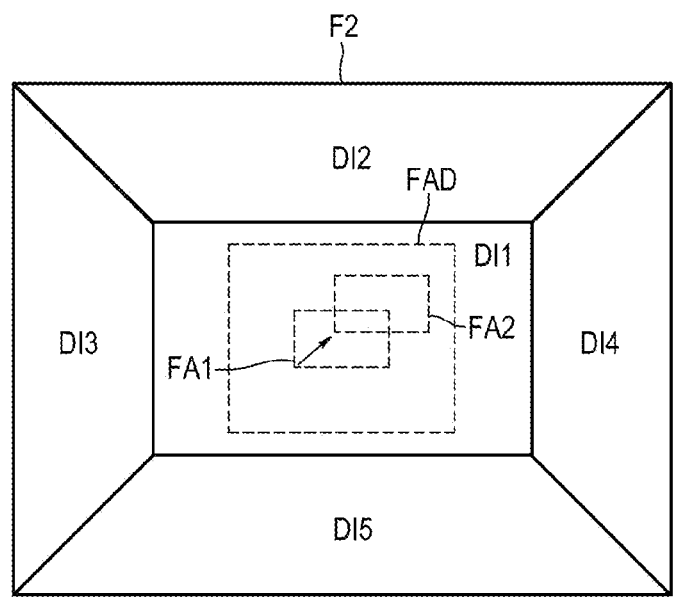

FIGS. 4A and 4B illustrate the operation of an embodiment of the face tracking unit 150-1 of FIG. 1. In FIGS. 4A and 4B, "F1" and "F2" denote input image frames, and the frame F1 is a frame temporally prior to the frame F2. Although the frames F1 and F2 may be consecutively received frames, they may simply be multiple frames that do not constitute a single frame. If thirty frames are input during a predetermined time period (e.g., one second), the frames F1 and F2 may be images temporally adjacent to each other.

If a face detection operation is performed on the frame F1 and a face is detected in a block FA1 of the divided input image DI1, the face tracking unit may perform a block matching operation and the like on the surrounding area FAD of the divided input image DI1 of the frame F2. By performing the block matching operation in this manner, a facial image included in a temporally adjacent frame may be continuously tracked.

A block matching operation is disclosed in detail in Korean Patent No. 10-0970119 published in the name of the applicant of the present disclosure, which is herein incorporated by reference. The block matching operation disclosed in this document may set up a surrounding area FAD in the neighborhood of the block FA1 where a face of the frame F1 is located. The surrounding area FAD may be set to be smaller than a region of the divided image A.

In addition, in order to search a block FA2 in the surrounding area FAD of the frame F2 having an image matching a facial image in the block FA1 of the frame F1, all or some of the blocks in the surrounding area FAD are compared, and the block FA2, which is a most closely matched block, can be found.

Accordingly, movement of the face from the block FA1 to the block FA2 can be tracked.

If the same facial image as the facial image detected in the frame F1 cannot be searched for in the surrounding area FAD in the frame F2 by the block matching operation of FIGS. 4A and 4B, the facial image may be searched from the entire region of a corresponding divided input image DI1 in a frame F3 (not shown) temporally following the frame F2 by the partial detection mode operation.

Figure 5:
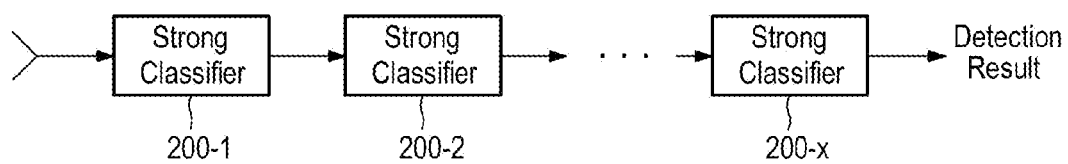
FIG. 5 is a block diagram illustrating the configuration of a face detector of an embodiment of the present disclosure.

FIG. 5 is a block diagram illustrating the configuration of a face detector 140-1 of an embodiment of the present disclosure, wherein the face detector 140-11 may include an x number of cascaded strong classifiers 200-1 to 200-*x*.

Referring to FIG. 5, the respective strong classifiers 200-1 to 200-*x* may detect similarities and output a result of face detection by matching feature patterns learned and selected by the Adaboost learning algorithm to sub-window images of the divided, resized, and rotated input image portions.

From among the cascaded strong classifiers 200-1 to 200-*x*, a strong classifier in a former stage may detect a face using a further smaller number of feature patterns learned and selected by the Adaboost learning algorithm as compared with a strong classifier in a latter stage. For example, the strong classifier 200-1 may use two different feature patterns, the strong classifier 200-2 may use four different feature patterns, and the strong classifier 200-x may use ten different feature patterns. Further, threshold values of the feature patterns respectively used by the strong classifiers 200-1 to 200-x may be different from one another.

The cascaded strong classifiers 200-1 to 200-x may generate a result of detecting a face when all of the strong classifiers 200-1 to 200-x detect the face.

Although not shown, each of other face detectors 140-12 to 140-1i, 140-11 to 140-1j, and 140-11 to 140-1k may also be configured to be the same as the face detector 140-1 of FIG. 5.

Figure 6:
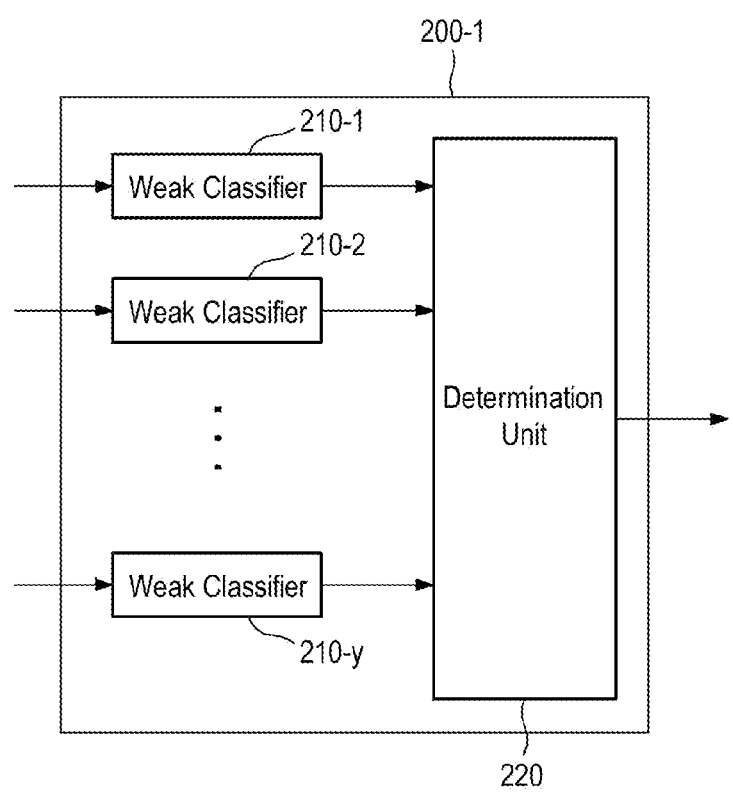
FIG. 6 is a block diagram illustrating a configuration of a strong classifier of FIG. 5.

FIG. 6 is a block diagram showing the configuration of a strong classifier of an embodiment of FIG. 5. Referring to FIG. 6, the strong classifier 200-1 may include weak classifiers 210-1 to 210-y and a determination unit 220.

The respective weak classifiers 210-1 to 210-y may use a y number of feature patterns different from one another, and may determine similarities by receiving and matching sub-window images of the divided, resized, and rotated input image portions and output a result indicating whether or not a face is detected. If more than a predetermined number of (e.g., y/2) weak classifiers from among the y number of weak classifiers 210-1 to 210-y output a result of detecting a face, the determination unit 220 may output a result of detection indicating that a face is detected.

The face detection device 100 shown in FIG. 1 may divide an input image into an n number of divided input image portions and perform a face detection operation on the n number of divided input image portions in parallel. However, the face detection device of the present disclosure may also perform the face detection operation on the n number of divided input image portions in series, which will be described with reference to FIG. 7.

Figure 7:
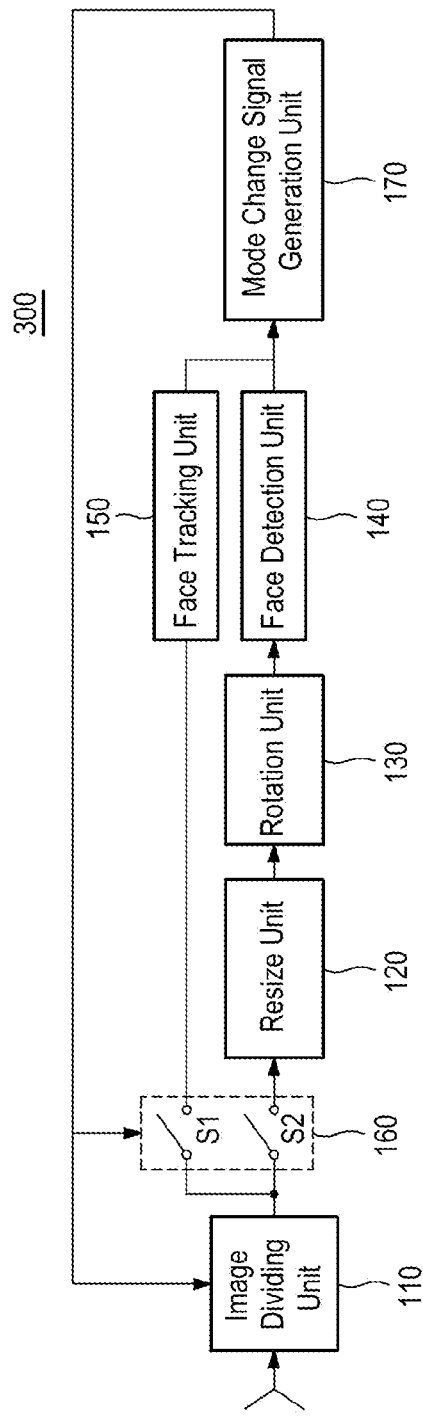
FIG. 7 is a block diagram illustrating a configuration of a face detection device according to another embodiment of the present disclosure.

FIG. 7 is a block diagram illustrating a configuration of a face detection device according to another embodiment of the present disclosure.

Referring to FIG. 7, the face detection device 300 may include an image dividing unit 110, a resize unit 120, a rotation unit 130, a face detection unit 140, a face tracking unit 150, a mode change unit 160, and a mode change signal generation unit 170.

Functions of each block shown in FIG. 7 are as follows.

The image dividing unit 110 may divide an input image that is received through an image pickup device, such as a camera, into a predetermined number of image portions and sequentially output the divided input image portions. The input images may include more than a predetermined number (e.g., ten) of frames that are received for a predetermined time period (e.g., one minute). The image dividing unit 110 may generate all of the divided input image portions for one frame, when a full detection mode signal is generated. When a partial detection mode signal or a face tracking mode signal is generated, the image dividing unit 110 may generate only a divided input image portion of a latter frame that includes a region corresponding to a region in a former frame in which a face was detected. Information on the region of the divided input image portion where the face was detected is stored in a control unit (not shown), and divided input image portions of a next frame corresponding to the region of the divided input image portion where the face was detected may be generated under the control of the control unit.

The resize unit 120 may generate divided and resized input image portions by applying a predetermined number of different magnifications to the divided input image portions. In addition, under the control of the control unit (not shown), five divided and resized input image portions may be generated by applying five different magnifications, for example, 0, ½, ¼, ⅛, and ¹⁄₁₆, to the divided image portion DI1 of FIG. 3, and also, generate three divided and resized input image portions by applying three different magnifications, for example, 1, ¼, and ¹⁄₁₆, to each of the divided image portions DI2 to DI5. The resize magnifications may be applied in the same way as the divided image portion DI1. The rotation unit 130 may generate a predetermined number of divided, resized, and rotated image portions by applying a predetermined number of rotation angles to the divided and resized image. In addition, under the control of the control unit (not shown), five divided, resized, and rotated input image portions may be generated by applying five angles, for example, 0 degree, 45 degrees, 90 degrees, −45 degrees, and −90 degrees, to the divided image portion DI1 of FIG. 3, and generate three divided, resized, and rotated input image portions by applying three rotation angles, for example, 0 degree, 90 degrees and −90 degrees, to each of the divided image portions DI2 to DI5. The rotation angles may be applied in the same way as the divided image portion DI1.

The face detection unit 140 may receive each of the divided, resized, and rotated image portions and perform a face detection operation, and the mode change signal generation unit 170 may generate a partial detection mode signal for a divided region where a face was detected. The face detection operation may be performed using feature patterns learned and selected, for example, by the Adaboost learning algorithm.

The face tracking unit 150 may receive a divided input image portion and track whether the same face as the detected facial image is present in a surrounding area that includes a region in a divided input image portion of a latter frame corresponding to a region in a divided input image portion of a former frame at which the face was detected. For example, if a face is detected in a divided input image portion DI1 of an input image of a first frame, the face tracking unit 150-1 may track whether the same face as the face detected in the input image of the first frame is present in a surrounding area that includes a region in a second frame corresponding to the region in the input image of the first frame where the face was detected, i.e., the surrounding area in the divided input image portion DI1 of an input image in the second frame, using a block matching method or the like.

The mode change unit 160 may change to a face detection mode by turning off the switch S1 and turning on the switch S2 when a full detection mode signal or a partial detection mode signal is generated, and change to a face tracking mode by turning on the switch S1 and turning off the switch S2 when a face tracking mode signal is generated.

The mode change signal generation unit 170 may generate a full detection mode signal when a result of the face detection operation of the face detection unit 140 performed for all of divided, resized, and rotated input image portions of at least one input image shows that a face is not detected at all or when a full detection needs to be periodically performed. The mode change signal generation unit 170 may generate a partial detection mode signal when a result of the face tracking operation of the face tracking unit 150 performed for a certain surrounding area in a certain divided input image portion shows that a face is not detected. The mode change signal generation unit 170 may generate a face tracking mode signal when the face tracking operation of the face tracking unit 150 shows that a face is detected.

FIG. 8 is a flowchart illustrating the operation of a face detection method of an embodiment of the present disclosure.

First, divided input image portions may be generated by dividing each of frames sequentially acquired (Step 400). For example, the divided input image portions are generated by dividing each of input images of thirty frames respectively acquired at different time points for a predetermined time period (e.g., one second). The different time points may refer to the plurality of frames being sequentially received over a predetermined time period.

It is determined whether the mode of operation is the full detection mode operation (Step 410). The full detection mode operation may be executed when a face is not detected in any of the divided input image portions or may be periodically executed regardless of detection of a face.

If in the full detection mode operation, a resize operation is performed on each of the divided input image portions of the first frame (Step 420). As in the description for FIGS. 1 and 7, the magnitude and number of magnifications applied to the respective divided input image portions may be different from one another.

A rotation operation is performed on each of the divided and resized input image portions (Step 430). As in the description for FIGS. 1 and 7, the magnitude and the number of rotation angles applied to the respective divided and resized input image portions may be different from one another.

A face detection operation is performed on each of the divided, resized, and rotated input image portions (Step 440). As in the description for FIGS. 1 and 7, the face detection operation may be performed using feature patterns learned and selected by the Adaboost learning algorithm.

If a face is detected in at least one of the divided input image portions of the first frame as a result of Step 440, the flow proceeds to Steps 400, 410, 450, and 460, and the face tracking mode operation is performed. If a face is not detected in all of the divided input image portions of the first frame as a result of Step 440, the flow proceeds to Steps 400, 410, 420, 430, and 440, and the full detection mode operation may be performed on a subsequently input second frame.

It is determined whether the mode of operation is a face tracking mode operation (Step 450).

As described above, if a face is detected in at least one of the divided input image portions of the first frame as a result of Step 440, the flow proceeds to Step 450, and if it is determined that the mode of operation is a face tracking mode operation as a result of Step 450, the face tracking operation is performed for a surrounding area that includes a region in the second frame corresponding to a region in the first frame where the face was detected, i.e., the surrounding area present in the corresponding divided input image portion of the second frame (Step 460). The face tracking operation may also be easily understood with reference to the description related to the face tracking unit 150 of FIGS. 1 and 7.

If it is determined that in the mode of operation is not the face tracking mode operation as a result of Step 450, the mode of operation is determined to be the partial detection mode operation, and the flow proceeds to Step 470.

If in the partial detection mode operation as a result of Step 450, a resize operation is performed using a divided input image portion that includes a region in a third frame (a frame temporally following the second frame) corresponding to a region in the first frame where the face was detected (Step 470).

A rotation operation is performed on the divided and resized input image portion (Step 480).

A face detection operation is performed on the divided, resized, and rotated input image portion (Step 490).

If a face is detected in the divided input image portion as a result of Step 490, the flow proceeds to Steps 400, 410, 450, and 470, and the partial detection mode operation may also be continuously performed on the divided input image of a subsequently input fourth frame. Here, as another example, if a face is detected in a specific divided input image portion of the third frame as a result of Step 490, the flow proceeds to Steps 400, 410, 450, and 460, and the face tracking mode operation may also be performed for a certain surrounding area in a specific divided input image portion of the subsequently input fourth frame through a block matching method or the like. This can be applied to the entirety of the present disclosure. In addition, if a face is not detected as a result of Step 490, the flow proceeds to Steps 400, 410, 420, 430, and 440, and the full detection mode operation may be performed on the divided input image portions of the subsequently input fourth frame.

Although the input images of the first frame and the second frame are images that are ordered by the time they are input, they are not necessarily consecutively input images. In the same manner, the second frame and the third frame are respectively input at time points different from those of the third frame and the fourth frame. When input images of thirty frames are input, the full detection mode operation may be performed by simultaneously performing the face detection operation on the five divided input image portions (referred to as first to fifth divided image portions) included in the first frame. Alternatively, a modified example may be assumed in which the full detection mode operation may be conducted by performing the face detection operation on the first divided image portion for the first frame, the face detection operation on the second divided image portion for the second frame, the face detection operation on the third divided image portion for the third frame, the face detection operation on the fourth divided image portion for the fourth frame, and the face detection operation on the fifth divided image portion for the fifth frame. That is, although the full detection mode operation of the present disclosure may be configured to perform the face detection operation on all of the divided image portions of one frame, the full detection mode operation may be accomplished by performing the face detection operation so that a predetermined number of frames may cover the first to fifth divided image portions at least once as a search area. Other diverse modified examples may be assumed.

Although it has been described in the above-described embodiments that the face detection operation is performed after resizing an input image portion and rotating the resized input image portion, the face detection operation may be performed without rotating the resized input image portion. Accordingly, rotating the resized input image portion is not a mandatory operation, but the operation can be selectively applied. That is, the rotation units of the face detection device of FIGS. 1 and 7 and the rotators of FIG. 2 are not mandatory configurations, and Steps 430 and 480 of FIG. 8 are not mandatory steps, but these are configurations and steps that can be selectively included.

In addition, although it has been shown in FIGS. 1 and 7 that the resize unit, the rotation unit, and the face detection unit are separately configured, the face detection unit may be configured to include the resize unit and the rotation unit.

Also, although it has been described in the above-described embodiments that an input image portion is rotated after being resized, the face detection device may be configured to resize the input image portion after rotating the input image portion, or the face detection method may be implemented to perform the resize step after rotating the input image portion.

Further, the face detection method and device of the present disclosure may be implemented to perform the full detection mode operation on an entire input image, i.e., an image that is not divided, and perform the face tracking operation and the face detection operation by dividing the input image only in the face tracking mode operation and the partial detection mode operation being performed later.

Furthermore, the input image used in the face detection method and device of the present disclosure may be an image input in a preview state through an image pickup device.

The embodiments according to the present disclosure described above can be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present disclosure or a program command known to be used by those skilled in the art of the computer software field. The computer-readable recording medium includes, for example, a magnetic medium, such as a hard disk, a floppy disk and a magnetic tape, an optical recording medium, such as a CD-ROM and a DVD, a magneto-optical medium, such as a floptical disk, and a hardware device specially configured to store and execute program commands, such as a ROM, a RAM, a flash memory and the like. The program command includes, for example, a high-level language code that can be executed by a computer using an interpreter or the like, as well as a machine code generated by a compiler. The hardware devices can be configured to operate using one or more software modules in order to perform the processing according to the present disclosure, and vice versa.

In the foregoing discussion, although the present disclosure has been described in connection with the specific matters, such as the specific components, the exemplary embodiments, and the drawings, they are provided only for assisting in the understanding of the present disclosure, and the present disclosure is not limited to the embodiments. It will be apparent that those skilled in the art can make various modifications and changes thereto from these descriptions.

Therefore, the spirit of the present disclosure should not be limited to the above-described embodiments, and the appended claims and what are modified equally or equivalently thereto will be considered to fall within the scopes of the present disclosure.

The invention claimed is:

1. A face detection method, comprising:
(a) generating divided input image portions by dividing an input image into a predetermined number of regions, the input image including a frame from a plurality of frames sequentially received during a predetermined time period, including:
positioning a divided input image portion from among the divided input image portions of each of the frames at a center of each of the frames;
(b) resizing the respective divided input image portions of a first frame and performing a face detection operation on the divided and resized input image portions, when in a full detection mode operation, including:
applying a number of resize magnifications or a number of rotation angles to the divided input image portion positioned at the center of each of the frames, the number of resize magnifications or the number of rotation angles being greater than a number of resize magnifications or a number of rotation angles applied to divided input image portions other than the divided input image portion positioned at the center;
(c) when a face is detected in a specific region of at least one input image portion from among the divided and resized input image portions of the first frame in the face detection operation, proceeding to a face tracking mode operation and performing a face tracking operation on a surrounding area of a specific region in a divided and resized input image portion of a second frame corresponding to the specific region in the at least one input image portion from among the divided and resized input image portions of the first frame in which the face is detected; and
(d) when a face is not detected in the face tracking operation, proceeding to a partial detection mode operation and performing the face detection operation on a divided and resized input image portion of a third frame, the divided and resized input image portion of the third frame including a specific region in the third frame corresponding to the specific region in the at least the input image portion from among the divided and resized input image portions of the first frame in which the face is detected.

2. The method of claim 1, wherein:
step (b) comprises resizing and rotating the divided input image portions of the first frame and performing the face detection operation on the divided, resized, and rotated input image portions of the first frame, and
step (d) comprises resizing and rotating the divided input image portion of the third frame, the divided input image portion of the third frame including the specific region in the third frame corresponding to the specific region in at least the input image portion from among the divided input image portions of the first frame in which the face is detected, and performing the face detection operation on the divided, resized, and rotated input image portion of the third frame.

3. The method of claim 1, wherein, when a face is not detected in at least one input image portion from among the divided and resized input image portions of the third frame in the face detection operation of step (d), the method proceeds to the full detection mode operation to resize divided input image portions of a fourth frame and perform the face detection operation on the divided and resized input image portions.

4. The method of claim 1, wherein, when a face is detected in at least one input image portion from among the divided and resized input image portions of the third frame in the face detection operation of step (d), the method proceeds to the face tracking mode operation to perform the face tracking operation on a surrounding area of a specific region in a divided and resized input image portion in a fourth frame corresponding to the specific region in the third frame in which the face is detected.

5. The method of claim 1, when a face is detected in the face tracking operation of step (c), the face tracking mode operation is continued, and the face tracking operation is performed on a surrounding area of a specific region in a divided input image portion of a 2-A frame corresponding to a specific region in at least one input image portion from among the divided and resized input image portions of the second frame in which the face is detected, the 2-A frame temporally succeeding the second frame and temporally preceding the third frame.

6. The method of claim 1, wherein step (b) comprises performing the face detection operation by resizing, from among divided input image portions of the input image in at least one additional frame, divided input image portions of the at least one additional frame corresponding to a divided input image portion of the first frame in which a face is not detected, the at least one additional frame being input temporally after the first frame and before the second frame, the second frame temporally succeeding the first frame.

7. The method of claim 1, wherein the face tracking operation comprises tracking a block having the same facial image as a facial image detected in the face detection operation of step (b) by performing a block matching operation on an image in the surrounding area.

8. The method of claim 1, wherein the face detection operation of the full detection mode operation and the partial detection mode operation detects a facial image using feature patterns learned and selected by an Adaboost learning algorithm.

9. A face detection method, comprising:
(a) acquiring a plurality of frames of input images sequentially input during a predetermined time period;
(b) when in a full detection mode operation, performing a facial detection operation on a first frame;
(c) when a face is detected in a specific region of the first frame in the face detection operation, proceeding to a face tracking mode operation to generate divided input image portions of a second frame by dividing the second frame and performing a face tracking operation on a surrounding area of a specific region in a divided input image portion of the second frame corresponding to the specific region in the first frame; and
(d) when a face is not detected in the face tracking operation, proceeding to a partial detection mode operation and performing the face detection operation on a resized image portion of a divided input image portion of a third frame, the divided input image portion of the third frame including a specific region in the third frame corresponding to the specific region in the first frame, including:
applying a number of resize magnifications or a number of rotation angles to the divided input image portion positioned at the center of each of the frames, the number of magnifications or the number of rotation angles greater than a number of resize magnifications or a number of rotation angles applied to divided input image portions other than the divided input image portion positioned at the center.

10. The method of claim 9, wherein step (d) comprises resizing and rotating a divided input image portion of the third frame including the specific region in the third frame corresponding to the specific region in at least one input image portion in which the face is detected from among the divided input image portions of the third frame and performing the face detection operation on the divided, resized, and rotated input image portion of the third frame.

11. The method of claim 9, wherein when a face is not detected in at least one input image portion from among the divided and resized input image portions of the third frame in the face detection operation of step (d), the method proceeds to the full detection mode operation to resize divided input image portions of a fourth frame and perform the face detection operation on the divided and resized input image portions.

12. The method of claim 9, wherein, when a face is detected in at least one input image portion from among the divided and resized input image portions of the third frame in the face detection operation of step (d), the method proceeds to the face tracking mode operation to perform the face tracking operation on a surrounding area of a specific region in a divided and resized input image portion in a fourth frame corresponding to the specific region in the third frame in which the face is detected.

13. The method of claim 9, wherein, when a face is detected in the face tracking operation of step (c), the face tracking mode operation is continued, and the face tracking operation is performed on a surrounding area of a specific region in a divided input image portion of a 2-A frame corresponding to a specific region in at least one input image from among the divided and resized input image portions of the second frame, the 2-A frame temporally succeeding the second frame and preceding the third frame.

14. The method of claim 9, wherein the face tracking operation comprises tracking a block having the same facial image as a facial image detected in the face detection operation of step (b) by performing a block matching operation on an image in the surrounding area.

15. The method of claim 9, wherein the face detection operation of the full detection mode operation and the partial detection mode operation detects a facial image using feature patterns learned and selected by an Adaboost learning algorithm.

16. A face detection device, comprising:
a processor to execute:
an image dividing unit for dividing an input image into a predetermined number of regions to generate divided input image portions, the input image including a frame from a plurality of frames of input images sequentially received during a predetermined time period, wherein the image dividing unit positions one divided input image portion from among the divided input image portions of each of the frames at a center of each of the frames;
a mode change unit for sequentially transmitting the divided input image portions of a first frame when a full detection mode signal is generated for the first frame, sequentially transmitting a divided input image portion including a specific region in a second frame corresponding to a specific region of the first frame in which a face is detected when a face tracking mode signal is generated for the second frame temporally succeeding the first frame, and sequentially transmitting a divided input image portion including a specific region in a third frame corresponding to the specific region in the first frame in which the face is detected when a partial detection mode signal is generated for the third frame temporally succeeding the second frame;
a face detection unit for detecting a face by resizing the divided input image portions of the first or third frame transmitted through the mode change unit and performing a face detection operation, wherein the face detection unit detects the face by applying a number of resize magnifications to the divided input image portion positioned at the center of each of the frames, the number of resize magnifications greater than a number of resize magnifications applied to divided input image portions other than the divided input image portion positioned at the center;
a face tracking unit for performing a face tracking operation on a surrounding area of the specific region in the divided input image portion of the second frame transmitted through the mode change unit; and
a mode change signal generation unit for generating the face tracking mode signal when the face detection unit determines that a face is detected in at least one divided and resized input image portion from among the divided and resized input image portions of the first frame, and generating the partial detection mode signal when the face tracking unit determines that a face is not detected in the divided input image portion of the second frame.

17. The device of claim 16, wherein the face detection unit detects the face by applying a number of rotation angles to the divided input image portion positioned at the center of each of the frames, the number of rotation angles greater than a number of rotation angles applied to divided input image portions other than the divided input image portion positioned at the center.

18. The device of claim 16, wherein the face detection unit comprises:
 a resize unit for generating a predetermined number of divided and resized input image portions by resizing the divided input image portion in a predetermined number of different sizes; and
 a face detector for sequentially performing the face detection operation on the predetermined number of divided and resized input image portions.

19. The device of claim 18, wherein the face detection unit further comprises a rotation unit for sequentially generating a plurality of divided, resized, and rotated input image portions by rotating each of the divided and resized input image portions at a predetermined number of different rotation angles, wherein the face detector sequentially performs the face detection operation on the plurality of divided, resized, and rotated input image portions.

20. A non-transitory computer-readable recording medium having instructions, which when executed by a process perform:
 (a) generating divided input image portions by dividing an input image into a predetermined number of regions, the input image including a frame from a plurality of frames sequentially received during a predetermined time period, including:
  positioning a divided input image portion from among the divided input image portions of each of the frames at a center of each of the frames;
 (b) resizing the respective divided input image portions of a first frame and performing a face detection operation on the divided and resized input image portions, when in a full detection mode operation, including:
  applying a number of resize magnifications or a number of rotation angles to the divided input image portion positioned at the center of each of the frames, the number of resize magnifications or the number of rotation angles being greater than a number of resize magnifications or a number of rotation angles applied to divided input image portions other than the divided input image portion positioned at the center;
 (c) when a face is detected in a specific region of at least one input image portion from among the divided and resized input image portions of the first frame in the face detection operation, proceeding to a face tracking mode operation and performing a face tracking operation on a surrounding area of a specific region in a divided and resized input image portion of a second frame corresponding to the specific region in the at least one input image portion from among the divided and resized input image portions of the first frame in which the face is detected; and
 (d) when a face is not detected in the face tracking operation, proceeding to a partial detection mode operation and performing the face detection operation on a divided and resized input image portion of a third frame, the divided and resized input image portion of the third frame including a specific region in the third frame corresponding to the specific region in the at least the input image portion from among the divided and resized input image portions of the first frame in which the face is detected.

* * * * *